United States Patent

[11] 3,536,173

[72] Inventors Clifton S. Merkert
Springfield, and
Clayton Erb, Abington, Pennsylvania
[21] Appl. No. 792,932
[22] Filed Jan. 22, 1969
[45] Patented Oct. 27, 1970
[73] Assignee FMC Corporation
San Jose, California
a corporation of Delaware

[54] SPEED AND OVERLOAD RESPONSIVE VISCOUS FLUID DRIVE CLUTCHES
35 Claims, 13 Drawing Figs.
[52] U.S. Cl. ............................................. 192/56,
192/58, 192/103
[51] Int. Cl. ....................................... F16d 43/20,
F16d 31/08
[50] Field of Search ............................................ 192/56,
56(F), 58, 58(A—3), 103, 103(A), 104, 104(F),
105(B), 55

[56] References Cited
UNITED STATES PATENTS
| | | | |
|---|---|---|---|
| 1,862,802 | 6/1932 | Pope | 192/58(A—3)UX |
| 2,002,699 | 5/1935 | Larsen | 192/103(A)UX |
| 2,336,167 | 12/1943 | Dillon | 192/58(A3)UX |
| 2,368,299 | 1/1945 | Hayter | 192/103(A)UX |
| 2,395,047 | 2/1946 | Hanson | 192/58(A—3)X |
| 3,059,744 | 10/1962 | Sleeper | 192/104(F)X |
| 3,268,046 | 8/1966 | Hirano | 192/103(A)UX |

*Primary Examiner*—Allan D. Herrmann
*Attorney*—F. W. Anderson and C. E. Tripp

ABSTRACT: A fluid drive assembly of the viscous shear fluid type having driving and driven members defining force imparting and force receiving surfaces respectively and speed responsive means carried by the driven member for regulating the spacing between the force receiving and force imparting surfaces to control the force transfer between said driving and driven members.

Patented Oct. 27, 1970

INVENTORS.
CLIFTON S. MERKERT
CLAYTON ERB

BY F. W. Anderson
C. C. Tripp

ATTORNEYS.

Patented Oct. 27, 1970

INVENTORS.
CLIFTON S. MERKERT
CLAYTON ERB

BY F. W. Anderson
C. E. Tripp

ATTORNEYS.

INVENTORS.
CLIFTON S. MERKERT
CLAYTON ERB
BY F. W. Anderson
C. C. Tripp
ATTORNEYS

INVENTORS.
CLIFTON S. MERKERT
CLAYTON ERB

BY F.W. Anderson
C. E. Triggs

ATTORNEYS

SPEED AND OVERLOAD RESPONSIVE VISCOUS FLUID DRIVE CLUTCHES

BACKGROUND OF THE INVENTION

1. Field of the Invention

This invention relates to fluid drive assemblies for use in drive transmissions. Particularly this invention relates to fluid drive assemblies of the viscous shear fluid type embodying a new and improved device for regulating the transfer of forces between a prime mover and a load whereby the prime mover may be effectively and efficiently loaded and operated with maximum protection against overloading.

2. State of the Prior Art

The vast majority of the fluid drive assemblies of the viscous shear fluid type employ control devices for regulating the force transfer between driving and driven members which are responsive to torque created between said driving and driven members. Serious difficulties, however, have resulted from the use of such torque-responsive control devices. For instance, it is typical in devices of this nature that the gap or spacing between the force-imparting and force-receiving surfaces of the driving and driven members respectively is closed when the prime mover is started, making it difficult to achieve the soft starts which are desired in many drive situations.

Further, in high inertia loads, where at normal operating or full load speed smaller capacity motors might suffice, the less than full speed load-responsive characteristics of torque-responsive controls can necessitate utilization of larger motors. For instance, due to frictional contact between the parts of the prior art devices, it is impossible to accelerate high inertia loads over long time periods without overheating. Thus, acceleration to operating speed must occur during a shorter time interval necessitating the utilization of larger motors than are necessary to maintain such a high inertia load at operating speed once that speeds is attained.

In addition, with torque-responsive control devices, once the spacing between the aforementioned surfaces increases beyond a particular point due to an overload situation, the spacing frequently will not thereafter decrease until the load is reduced far below the rated load or until the motor is actually stopped and restarted.

Further, due to load variations and differences in the characteristics of motors, it is difficult to predict both the precise point at which slippage will occur between the driving and driven members of torque-responsive viscous shear fluid drives. Also, due to physical wear in torque-responsive control devices, consistency of operation can greatly hamper the efficiency and dependability of such fluid drive assemblies.

While certain prior art assemblies have provided types of speed-responsive control devices on fluid drive assemblies, the device is carried by the driving member and is therefore not directly responsive to speed changes of the load itself. Further, the efficiency of operation as well as the economy of production of the instant invention, particularly the ball element-inclined ramp combination speed-responsive control assembly, have not been achieved in these prior art devices.

SUMMARY OF THE INVENTION

This invention comprises a fluid drive of the viscous shear fluid type having a driving member and a driven member rotatable about an axis by a driving force transferred through a viscous shear fluid medium from the driving member. A force-receiving surface is defined on a movable force transfer member carried by and rotated with the driven member. The force-receiving surface is disposed in selectively variable spaced relation to a force-imparting surface of the driving member to define a drive gap therebetween. This invention further includes centrifugally-actuated means carried by and rotated with said driven member, said centrifugally-actuated means being carried in such a manner as to permit reciprocal movement of weighted elements relative to the axis of rotation of said driven member; their spacing from said axis being proportional to the speed of rotation of the driven member. Finally, this invention may include means for translating the centrifugal force exerted on said centrifugally actuated weighted elements for moving the force transfer member to close the gap between the force imparting and receiving surfaces. The force exerted on the movable force transfer member and thereby the displacement of said transfer member is accurately controlled proportionally to the speed of rotation of the driven member. Means are provided for biasing the force transfer member against the force of the centrifugally-actuated elements to regulate the movement of the transfer member by said elements and for moving the force transfer member in the opposite direction when the centrifugal force or the speed of rotation of the driven member falls below a predetermined level. Thus, the speed related displacement of the movable member varies the spacing between the force-imparting and force-receiving surfaces of the driving and driven members respectively to thereby vary the force transfer between said driving and driven members in response to the rotational speed of the driven member.

It is an object of this invention to alleviate the aforementioned difficulties in the art by providing a new and improved fluid drive assembly for effecting an efficient, predictable and dependable drive transmission at a minimum cost of installation and maintenance.

It is also an object of this invention to provide such a drive assembly of the viscous shear fluid type which is responsive to the load speed for regulating the transmission of force between a prime mover and the load.

It is also an object of this invention to provide such a fluid drive assembly wherein an initial torque surge is applied to the load to overcome friction and load inertia, the torque then diminishing rapidly such that a minimum of force is transferred to the load during the time in which the speed of the output member is built to an operating level; thus the load is gradually applied to the prime mover after the prime mover has built substantially to its full operating speed for effecting a smooth, efficient and soft loading of the prime mover.

It is a further object of this invention to provide a highly sensitive fluid drive assembly which is capable of increasing and decreasing the slippage between the driving and the driven members to decrease and increase respectively, the loading of the prime mover, particularly to provide such a fluid drive assembly which will quickly respond to a decrease in the load after overloading to decrease the slippage and thereby provide additional driving force to the load without the necessity of stopping the prime mover or without the necessity of allowing the load to decrease to an unreasonably low level before the assembly responds.

As a further object of this invention, such a fluid drive assembly of the viscous shear fluid type is provided which is capable of accelerating high inertia loads for long time periods without overheating thereby permitting utilization of smaller motors.

It is also a principal object of this invention to provide efficient overload protection to the prime mover capable of absorbing intermittent shocks as well as continued overloading.

As a further object of this invention a fluid drive assembly having a new and improved speed-responsive control means is provided wherein such control means is operatively coupled to the driven member and is actuated responsively to the speed of revolution of the driven member to effectively regulate the transmission of force between the driving member and the driven member.

It is a further object of this invention to provide a fluid drive assembly having a plurality of spherical or ball elements disposed in circumferentially-spaced relation about the rotational axis of the driven member, said ball elements being capable of displacement toward and away from said axis by a distance proportional to the rotation speed of said driven member, said displacement of said ball elements being employed for controlled displacement of a force-receiving surface carried by a movable member on said driven means to effectively and efficiently increase and decrease the spacing between said force-imparting and force-receiving surfaces to thereby regulate the transfer of force between the driving and driven members.

It is a further object of this invention to provide a new and improved apparatus for effecting such a regulation of the spacing between said force-imparting and receiving surfaces wherein said ball elements are driven by said centrifugal force into abutting relation with a related inclined surface for translating the centrifugal force to a force having a component capable of moving the force-imparting surface in a direction axially of the driven shaft for regulation of the spacing between said force-imparting and force-receiving surfaces.

It is a further object of this invention to provide such an assembly for translating the aforestated centrifugal force with a minimum of apparatus and a maximum of sensitivity such that the fluid drive assembly is quickly responsive to minute changes in the loading to thereby maintain a relatively constant operating condition for the prime mover.

A further object of this invention is to provide a fluid drive assembly utilizing the aforestated ball elements and inclined surface wherein a single ring of spaced ball elements about the drive shaft is employed for effecting the displacement of a pair of force transfer members each defining force-receiving surfaces, said transfer members being moved in opposed directions whereby the driving force may be transferred through the viscous shear fluid at a pair of locations to effectively increase the potential force transfer from the driving means to the driven means.

It is also an object of this invention to provide such ball elements and cooperating inclined ramp surfaces to effect a smooth and efficient camming action of the movable member having the force-receiving surface defined thereon wherein each of the ramp surfaces and the ball elements rotate with said driven shaft such that there is no relative sliding movement between said ball element and said ramp surfaces to cause wear and decrease the consistency of operation of the control device.

It is a further object of this invention to provide a spoiler assembly at a position embedded in one of the force-receiving and force-imparting surfaces to disturb the essentially linear flow of the viscous shear fluid between the force-imparting and receiving surfaces responsively to overloading conditions to effectively and efficiently decrease the force-transmitting capabilities of said fluid to provide an additional cushioning effect between the driven and driving member.

As an additional object of this invention, a new and improved key-keyway arrangement is provided between the force transfer member and the driven member to permit relative axial movement while transferring rotational driving forces.

Other objects and advantages of the novel features of this invention will become apparent from the following description taken in connection with the accompanying drawings wherein embodiments of this invention are set forth by way of illustration and example. It is, however, expressly understood that the drawings are for the purpose of illustration only and are not intended to define the limits of the invention. Further, the drawings merely illustrate preferred embodiments incorporating the features of this invention.

DESCRIPTION OF THE PREFERRED EMBODIMENTS

Figure 1:
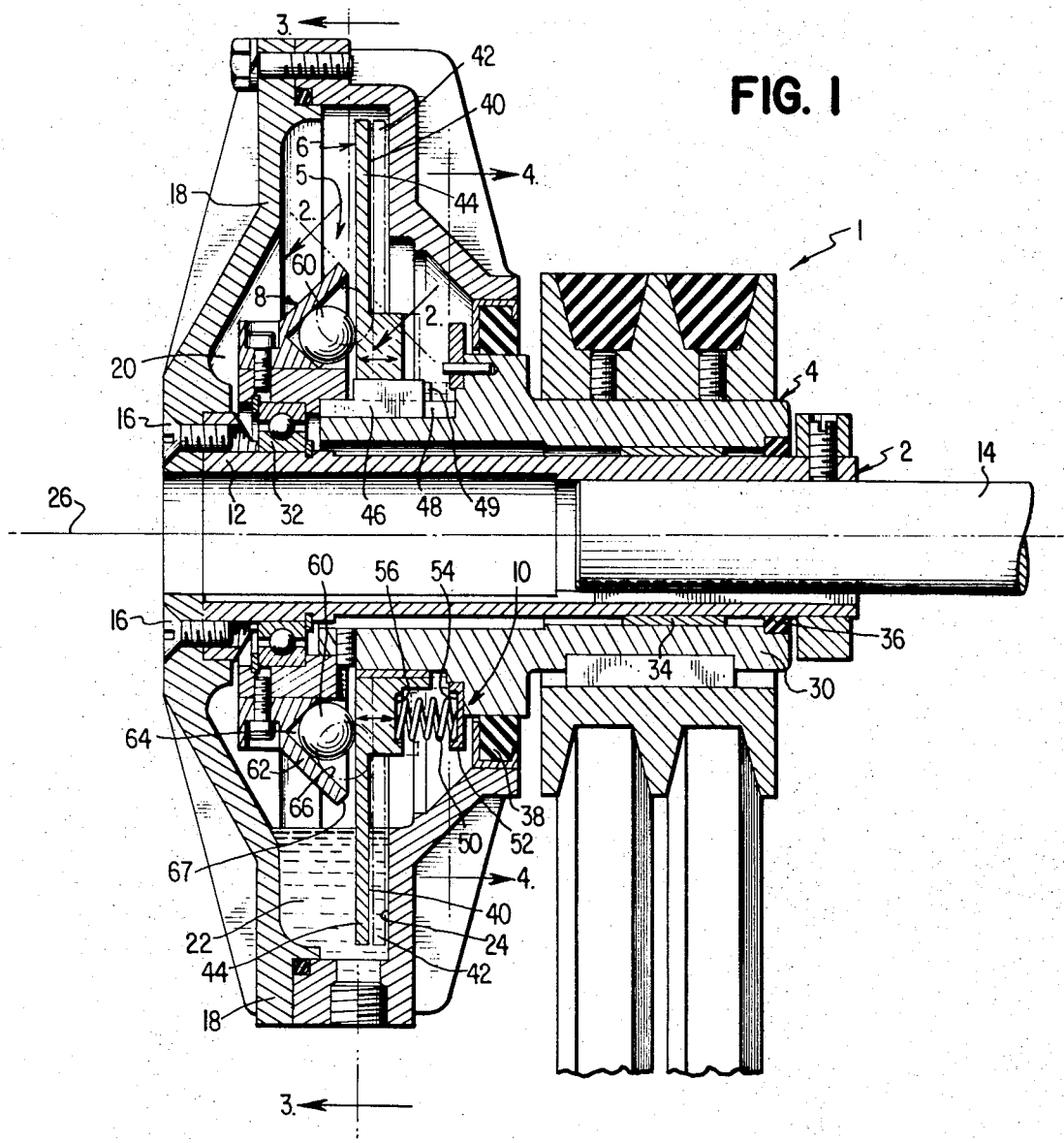
FIG. 1 is an axial sectional view through the axis of rotation of the driving and driven members illustrating a fluid drive assembly of the viscous shear fluid type embodying the features of this invention.
Figure 2:
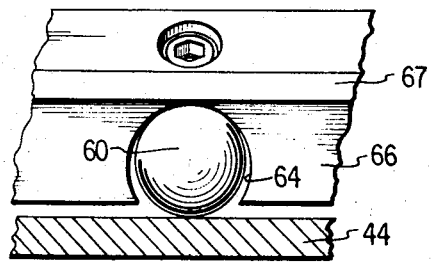
FIG. 2 is a sectional view taken on line 2—2 of FIG. 1 illustrating a ball element housed in the ball element retaining pocket of a ball cartridge carried by the output shaft or driven member.

Referring to FIG. 1, a fluid drive assembly of the viscous shear fluid type embodying the features of this invention is designated by the reference numeral 1. While this drive assembly constitutes one of the preferred embodiments of this invention, the particular arrangement, interconnection and shape of the various elements of the assembly other than those specifically defined in the claims and primarily related to the speed-responsive control means for regulating the force transfer between the driving and driven members is not intended as limiting and other arrangements, interconnections as well as shapes can be employed for such elements not limited by the claims while still practicing the spirit of this invention.

The fluid drive assembly 1 is basically comprised of an input or driving member 2, an output or driven member 4 and a speed-responsive control assembly 5 comprising a force transfer member 6, a centrifugally-actuated assembly 8 and a biasing assembly 10.

In the illustrated embodiment, the input or driving member 2 is conventionally comprised of a keyed receiving cylinder 12 for receipt of an input shaft 14 from a prime mover. As is also conventional, the keyed receiving cylinder 12 is mounted by screws 16 to a housing member 18 which defines a chamber 20 for housing the viscous shear fluid 22 as well as the various components of the speed-responsive control assembly 5. The shape, arrangement and cooperative interconnection of the elements of the driving member 2 with the driven member 4 are generally immaterial to the spirit of this invention. As illustrated, the housing 18 defines a force-imparting surface 24 which extends circumferentially of the rotational axis 26 of the driving and driven members 2 and 4 in contacting relation with the viscous shear fluid 22 for imparting a rotational driving force to the viscous shear fluid. It is only important in this specific regard that a driving member of some type be employed to act on a viscous shear fluid for transfer of the driving force from the driving member to said shear fluid.

Figure 3:
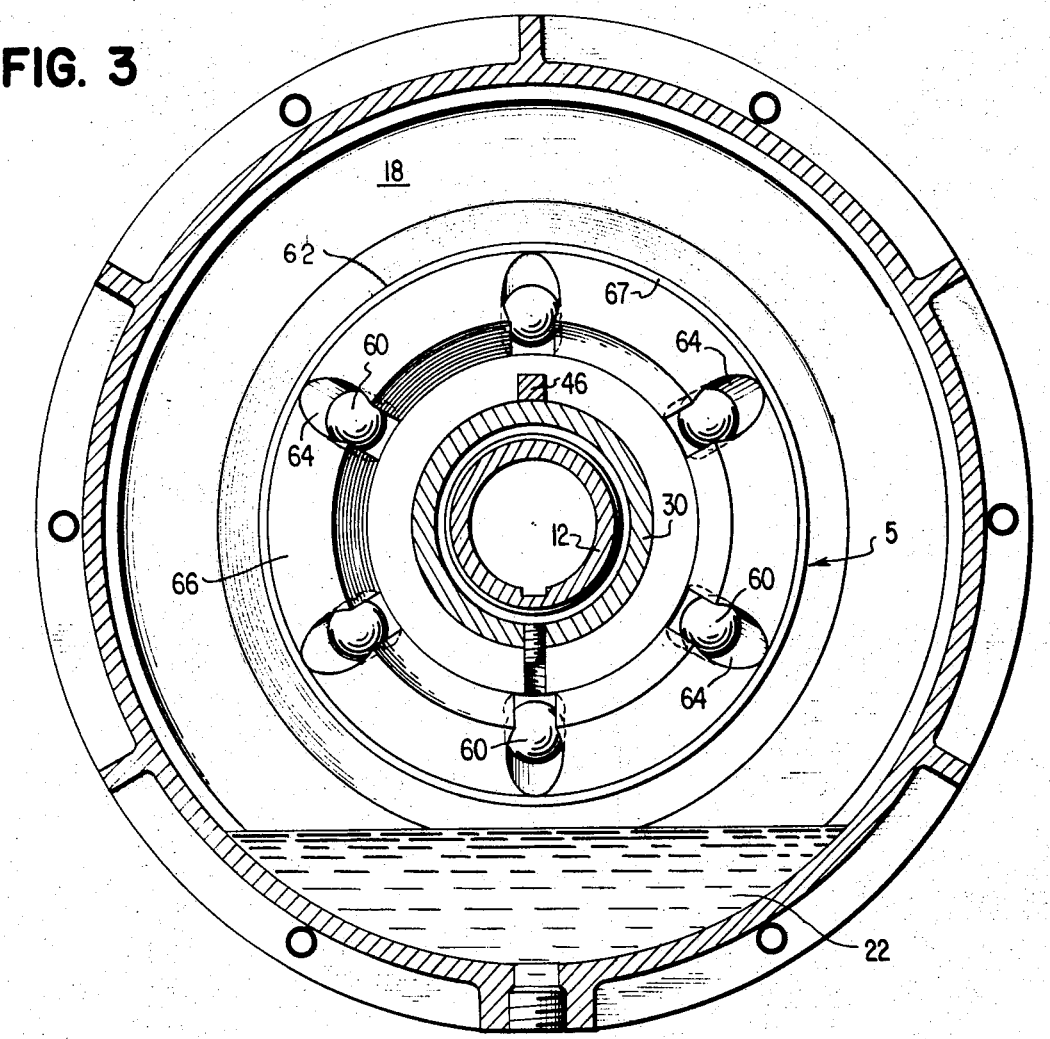
FIG. 3 is a sectional view taken on line 3—3 of FIG. 1 showing, in section, the input and output members, the housing and illustrating six ball elements respectively positioned in ball element retaining pockets in the ball cartridge.
Figure 4:
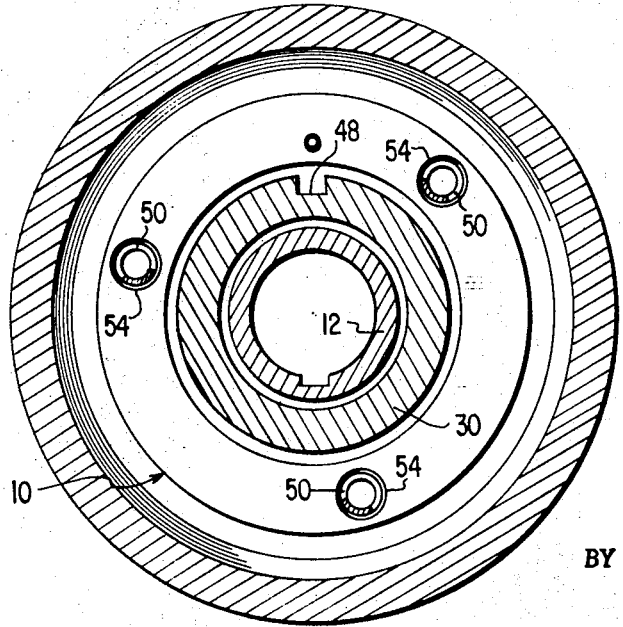
FIG. 4 is a sectional view taken on line 4—4 of FIG. 1 through the housing, input and output members illustrating the placement of biasing springs, circumferentially of the shafts, in a spacing collar.

Referring to FIGS. 1, 3 and 4, the output or driven member 4 is operatively positioned for rotational drive about axis 26 and is specifically comprised of a cylindrical or sleeve member 30 disposed circumferentially of the cylindrical member 12 of the input member 2 and supported at one end thereof by a ball bearing assembly 32 and at the other end thereof by a bushing 34. An oil seal 36 is provided adjacent the bushing 34. A second oil seal 38 is provided between the housing member 18 of the input member 2 and the output member 4. While the driven member 4 has been illustrated as having a common rotational axis with the driving member 2 such is certainly not essential to the concepts of this invention. The drive axis of the respective members 2 and 4 could be aligned as illustrated in the coupling arrangement of FIG. 5 or as required, the axis of these members could be otherwise orientated with appropriate drive components interconnected to effect the desired drive transfer from the force-imparting surface 24 of the driving member 2 to the viscous shear fluid medium 22 for ultimate transfer to the driven member 4.

Still referring to FIGS. 1, 3 and 4, the speed-responsive control assembly 5 is operatively connected to the driven member 4 and is responsive to the rotational speed of the driven member 4 to effectively and efficiently regulate the force transfer between the viscous shear fluid medium 22 and the driven member 4. The driven member 4 has mounted thereon for sliding axial movement thereof, the force transfer member 6. The force transfer member 6 defines a force-receiving surface 40 in opposed spaced relation to the force-imparting surface 24 defining therebetween a drive gap 42. The viscous shear fluid medium 22 is rotationally driven through the drive gap 42 by the rotational drive of the input or driving member 2 to provide a force transfer medium. As is conventional in the art, by varying the spacing between the force-imparting and receiving surfaces 24 and 40, respectively, the amount of force transfer between driving and driven members 2 and 4 is effectively regulated. This invention effects that regulation responsively to the speed of the driven member 4. In the illustrated embodiment, the force transfer member 6 is shown as a shear plate or rotor 44 having a key 46 received in a keyway 48 defined in the driven member 4 such that the rotor 44, while rotatable with the driven member 4, is reciprocally slidable between the full load position illustrated in dashed lines in FIG. 1 and the open or start position illustrated by full lines in FIG. 1. Key 46 may be formed of various materials, either metallic or nonmetallic or even metallic with a nonmetallic coating such as a suitable low friction synthetic resin. Stops or abutments 49 are provided on the driven member 4 for limiting the movement of the force transfer member 6.

The reciprocal movement of the rotor 44 to increase and decrease the drive gap 42 is effected by the opposed driving forces of the biasing assembly 10 and the centrifugally actuated assembly 8. Referring to FIGS. 1 and 4, the biasing assembly 10 is illustrated as three compression springs 50 spaced circumferentially of the common drive axis 26 and interposed between a spacer collar 52 and the rotor 44. In the preferred embodiment, recessed portions 54 and 56 are provided in the spacer collar 52 and the rotor 44 respectively in order to properly maintain the position of the springs 50. Certainly other and different types of biasing means may be employed as for instance the conventional wavy washer or the conventional cylindrically curved spring washer or for that matter any other type of means which provide the appropriate opposing force on the force transfer member 6.

The centrifugally-actuated assembly 8 is positioned on the opposite side of the rotor 44 from the springs 50 as is illustrated in FIG. 1. Referring to FIG. 3 the centrifugally-actuated assembly 8 is disposed circumferentially of the driving and driven members 2 and 4 respectively and is comprised of a plurality, six, spherical or ball elements 60. The ball elements 60 are spaced circumferentially in axially aligned relation of the driving and driven members 2 and 4. Ball elements 60 are carried by a ball cartridge 62 which defines ball retaining pockets 64 for maintaining the circumferential spacing of the ball elements upon rotation of the output member 4. The pockets 64, while maintaining this circumferential spacing, allow movement of the ball elements 60 reciprocally toward and away from the axis 26. It is critical that these centrifugally-actuated members be responsive to the rotational driving speed of the driven member 4 such that the desired gap 42 may be effectively controlled and regulated in respect to the output speed.

Referring to FIG. 1, the ball elements 60 each have a surface in rolling contact with the force transfer member 6. In this illustrated embodiment, the ball cartridge 62 at each of the retaining pockets 64 defines a surface 66 inclined relative to the rotational axis 26 extending outwardly away from said axis 26 in the direction of movement of the force transfer member 6 as effected by the ball elements 60. The spacing between the outer edge 67 of the inclined surface 66 and the force transfer member 6 is always less than the diameter of the ball element 60 such that the ball elements are always retained within the pockets 64. In this manner the inclined surface 66 serves to translate the centrifugal force exerted on the ball elements to a force having a component directed in the desired movement direction transversely of the drive gap 42 and axially of the driven member 4.

Figure 6:
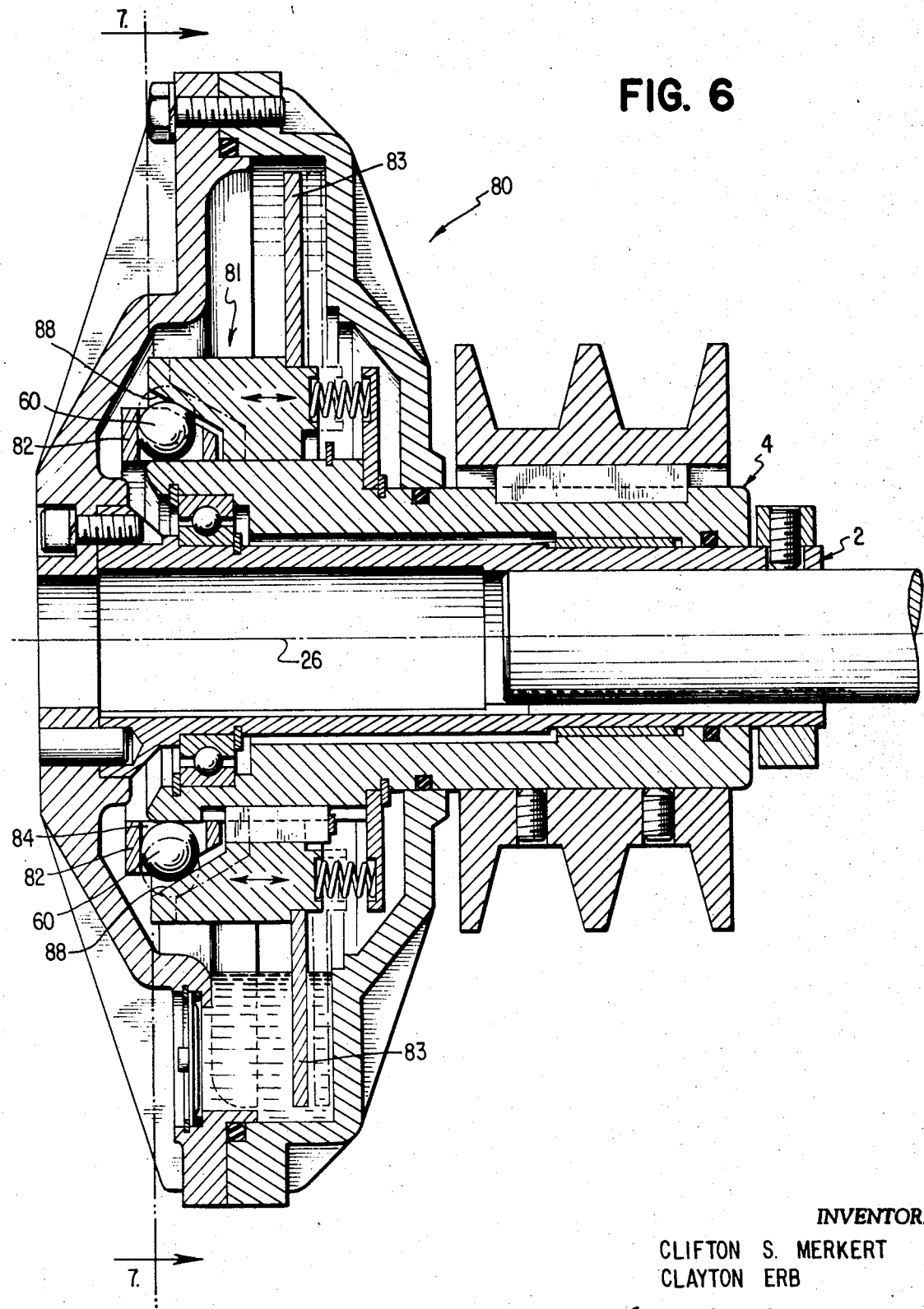
FIG. 6 is an axial sectional view through a fluid drive assembly illustrating a modification of this invention wherein the ball elements are housed in the pockets of a ball cartridge with an inclined surface defined on the force transfer member in position for engagement with the ball elements.

As is illustrated in other modifications of this invention, for instance FIG. 6, the inclined force translating surface may be provided on the force transfer member 6 rather than on the ball cartridge 62. It is contemplated that certain modifications of this invention would not require such a force translating means as the direction of movement of the centrifugally-actuated means carried by the driven member 4 could be, as a result of the centrifugal force only, movable in a direction transverse to the drive gap 42, thus eliminating this particular element of the combination. Further it is contemplated that other and different types of force translating means could be utilized such as that illustrated in FIG. 13. Further it is contemplated that other types of camming elements rather than the ball type elements illustrated herein can be employed for effecting the movement of the force transfer means 6, however the ball-inclined surface combination illustrated herein is considered the most efficient arrangement as it provides for highly sensitive speed responsive gap regulation wherein wear from the relatively movable parts of the combination is reduced to a minimum, such providing for the regulation of the drive gap with a high degree of both predictability and consistency.

In operation the speed-responsive control assembly 5 of the preferred embodiment illustrated in FIGS. 1 through 4 regulates the width of the drive gap 42 solely in response to the speed of the driven member 4. When the prime mover is initially actuated to rotate the drive shaft 14 to thereby rotate the driving member 2, the various components of this fluid drive assembly 1 are in the position illustrated in FIG. 1. Initial rotation of the driving member 2 imparts a torque surge on the output member 4 which serves to overcome starting friction and load inertia and commence rotation of the output member 4. The prime mover builds, almost immediately, to full load speed with the output speed lagging by a predetermined amount. When the speed of rotation of the output member 4 reaches a predetermined level, the centrifugally-actuated assembly 8 exerts a force on the force transfer member 6 which exceeds the counter force of the springs 50 and the width of the drive gap 42 is reduced by movement of the force transfer member 6 toward the force-imparting surface 24. As the gap 42 is closed, the speed of rotation of the output member 4 builds to the desired operating level. Because assembly 1 is capable of withstanding lengthy acceleration times without overheating, smaller motors with lower starting and full load torques can be used to accelerate high inertia loads.

As the motor approaches its full load speed, the drive gap 42 may be decreased gradually to its normal full load operating dimensions and thus gradually the load itself will be progressively increased to full speed. At full speed the minimum drive gap 42 will exist. Ideally this minimum dimension for the gap will be reached when force transfer member 6 is engaged with abutments 49 so that the drive then operates in a stabilized condition. Of course, there is always some degree of slippage between the drive shaft 14 and the output member 4. As the load is operating at full load speed, minor shocks and intermittent increased loading will be absorbed by the viscous shear fluid in the gap 42. If either complete jamming of the load or increased loading for a continued period occurs, such is reflected in the speed of the output member 4. As the speed of the output member 4 decreases, the centrifugal force exerted on the ball elements 60 decreases and ball elements 60 tend to converge toward the axis 26. Convergence toward the axis permits the springs 50 to drive the force transfer member 6 to increase the width of the drive gap 42. As the increased loading is alleviated and the speed of the output shaft again increases, the speed-responsive control assembly 5 quickly responds as the ball elements 60 roll outwardly along the inclined ramp 66 driving the force transfer member 6 to decrease the drive gap 42. It must be specifically noted that by use of the speed-responsive control assembly 5, the relative position of the force transfer member 6 and therefore the width of the drive gap 42 is predictable and consistent with the speed of the output member 4.

Figure 5:
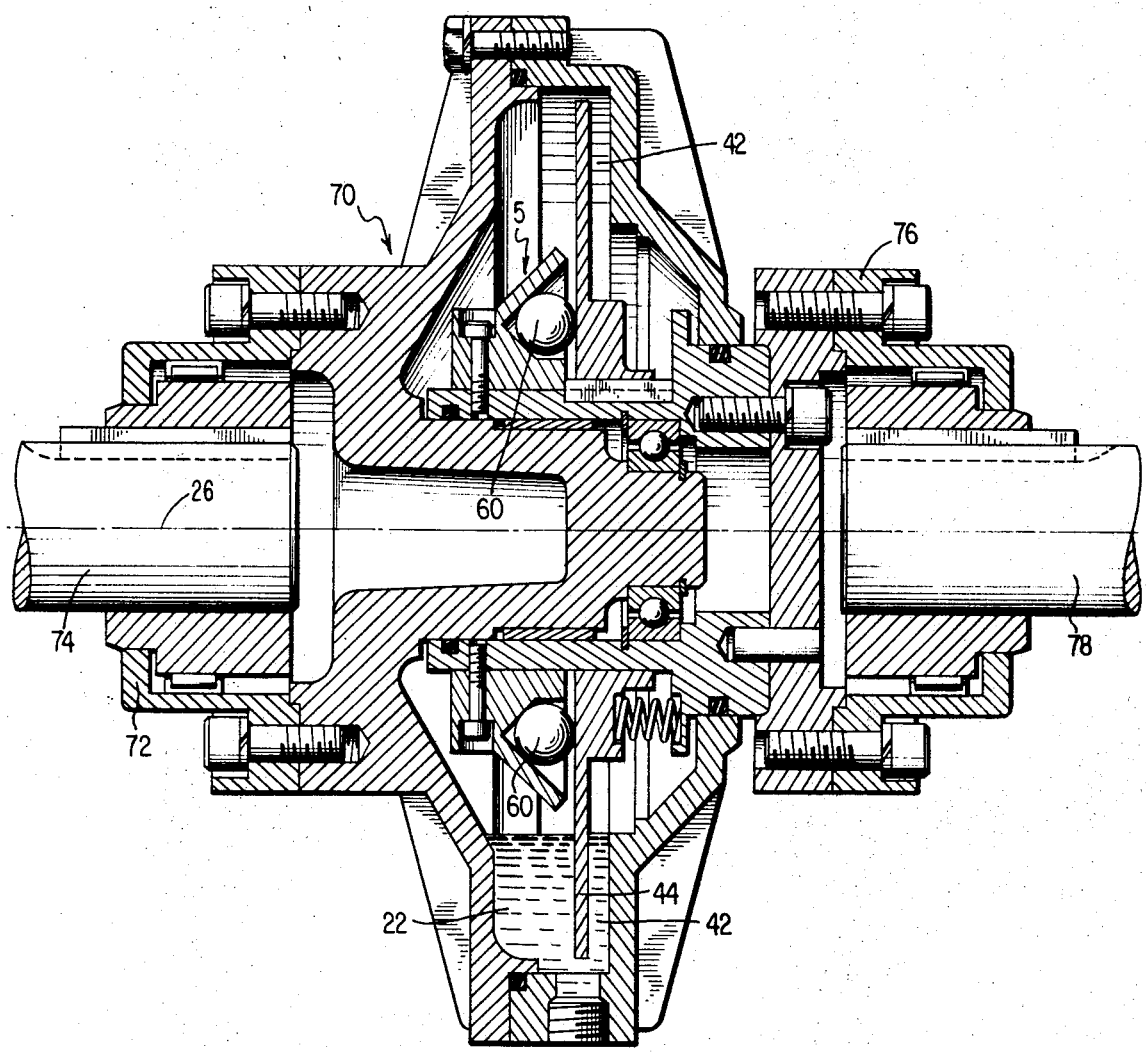
FIG. 5 is an axial sectional view illustrating a modification of this invention wherein speed responsive control device of the embodiment of FIG. 1 is employed on a coupling type fluid drive assembly.

Referring to FIG. 5, a modification of this invention is illustrated wherein the speed-responsive control assembly 5 is operatively mounted in a conventional coupling type fluid drive assembly 70. Assembly 70 includes a driving member 72 operatively connected to a drive shaft 74 for driving a driven member 76 which is in turn connected to a load drive shaft 78. The speed responsive assembly 5 is like that previously discussed in relation to FIGS. 1 through 4 and operates in the same manner to regulate the width of the drive gap 42. Referring to FIG. 6, a modified form of the speed responsive assembly is illustrated and designated by the reference numeral 80. Control assembly 80, like the control assembly 5 of the previously described embodiments, is carried by a driven member 4 but differs from assembly 5 in that the inclined surface employed for translating the centrifugal force exerted through the ball elements 60 to a force having an axial component for axial movement of a force transfer member 83 is defined on member 83.

Figure 7:
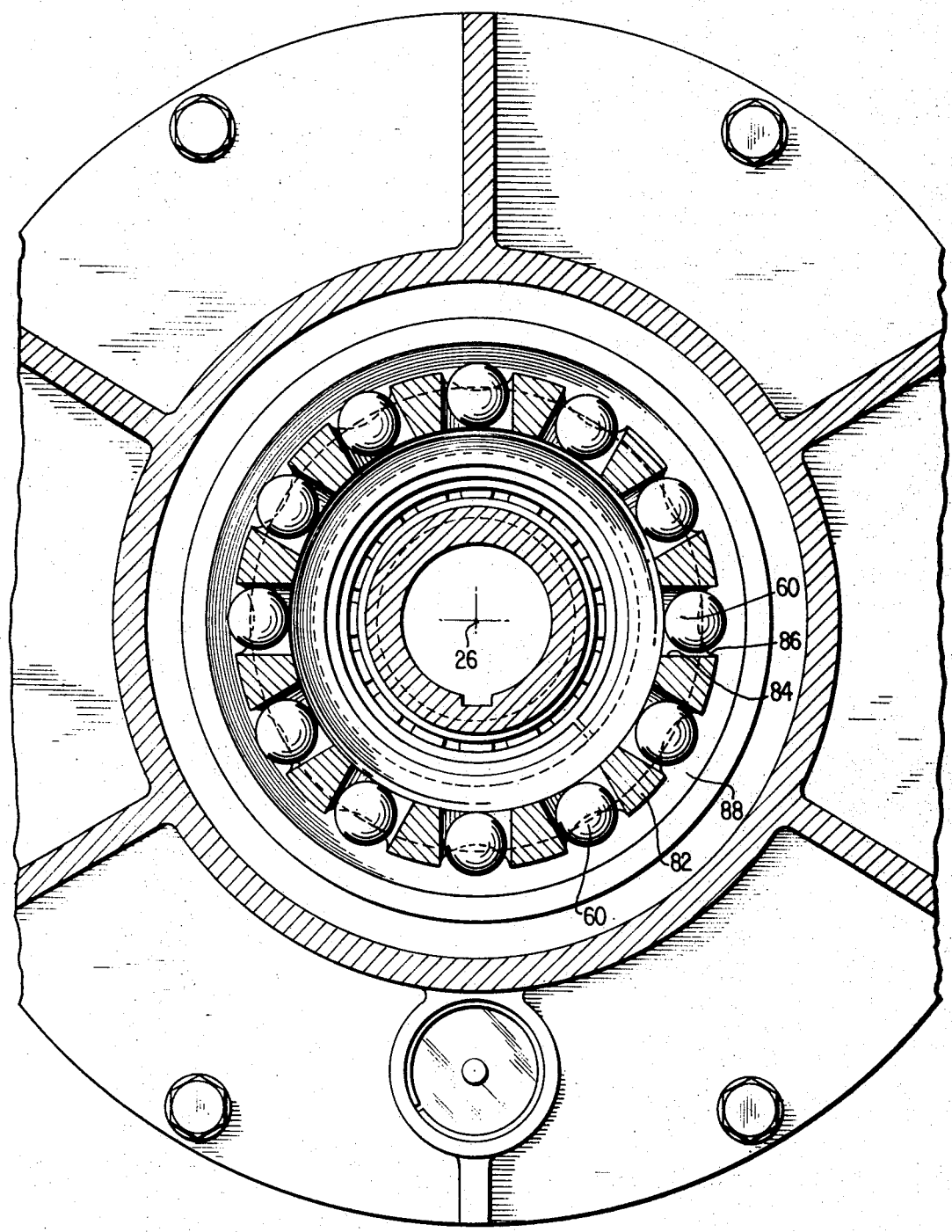
FIG. 7 is a sectional view taken on line 7—7 of FIG. 6 illustrating the positioning of twelve ball elements in circumferentially spaced relationship about the input and output members.

Referring to FIGS. 6 and 7, a ball cartridge 82 is carried by the driven member 4 and defines a plurality of circumferentially spaced, ball retaining pockets 84. The pockets 84 maintain the circumferential spacing of the ball elements 60 about the axis of rotation of the driven member 4 while allowing for movement of the ball elements 60 toward and away from said rotational axis 26. In this instance reciprocal movement of the ball elements is in a plane normal to said axis 26. The ball retaining pockets 84 defined by the ball cartridge 82 have an open outer side 86 opposite said axis 26, said open side 86 being substantially covered by a portion of an outlying inclined ramp surface or surfaces 88 defined on force transfer member 83. Force transfer member 83 of FIGS. 6 and 7 is otherwise like the force transfer member 6 described in FIGS. 1 through 4. The inclined surface or surfaces 88 defined on the force transfer member 83 is inclined relative to the axis of the driven member 4 toward said axis 26, said surface 88 being in abutting relation to each of the plurality of ball elements 60.

In operation, the sheave type drive assembly 80 is responsive to variations in the rotational speed of the driven member 4 in a manner similar to that of the embodiment of FIG. 1, with the exception of the direction of movement of ball elements 60. The ball elements 60 in response to the centrifugal force exerted by the rotationally driven member 4 move in a plane normal to axis 26 and by rolling contact along said inclined surface or surfaces 88 and the opposed surface of the ball cartridge 82 cam the transfer member 83 for movement along the driven member 4.

Figure 8:
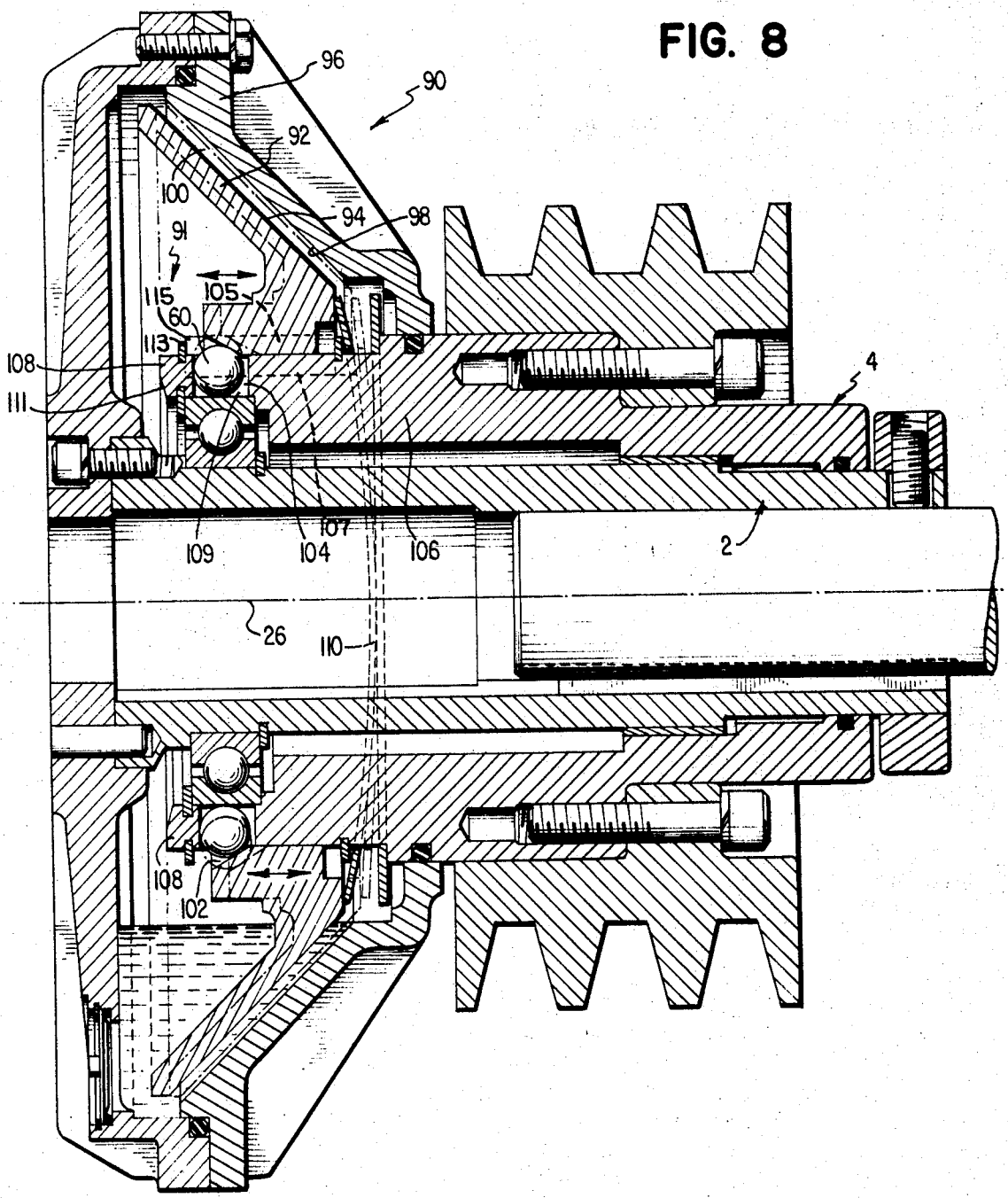
FIG. 8 is an axial sectional view through a fluid drive assembly illustrating a modification of this invention wherein the force receiving and imparting surfaces of the force transfer member and the driving member respectively are inclined relative to the common drive axis of the driven and driving members.

Referring to FIG. 8, a modification of this invention is illustrated in a drive assembly designated by the reference numeral 90. Drive assembly 90 includes a modified speed-responsive control assembly 91 operatively carried by the driven member 4 and responsive to the rotational speed of driven member 4. Speed-responsive control assembly 91 includes a force transfer member 92 differing from force transfer member 6 in that the force-receiving surface 94 defined thereon is inclined relative to the rotational axis, whereas, the force-receiving surface 40 of force member 6, as illustrated in FIG. 1, is disposed in a plane normal to axis 26. Housing 96 of driving member 2 defines a force-imparting surface 98 in opposed spaced relation to force-receiving surface 94 across a drive gap 100, said surfaces 94 and 98 being parallel.

The relationship of force transfer member 92 and ball elements 60 is like that described in relation to the embodiment of FIGS. 6 and 7, the inclined surface 102 being defined on the force transfer member 92. The ball retaining means of FIG. 8, however, differs slightly from that illustrated in FIGS. 6 and 7. Ball elements 60 are retained in ball-retaining pockets 104 formed in driven member 4. Pockets 104 are defined by body portion 106 of the driven member 4 and a member 108 having circumferentially spaced axially extending flanges 109 interconnecting the body portion 106 and a rim portion 111, thereby providing circumferentially spaced pockets 104.

Ball elements 60 are inserted into the integral pockets 104 through a filling slot (not shown) defined in the force transfer member 92 through the inclined surface thereof. Before the force transfer member 92 is keyed to the driven member 4, the member 92 may be rotated to align each of the pockets 104 with the filling slot to allow insertion therein of a ball element 60. After insertion of all the ball elements 60, a key slot 105 in the force transfer member is aligned with a key seat 107 in the driven member 4 and key 115 is inserted. Key 115 is retained in slot 105 and seat 107 by a retaining ring 113. When the slot 105 and seat 107 are aligned, the filling slot is not aligned with a pocket 104, thus the balls 60 may not slip out of pockets 104.

In operation, assembly 91 is responsive to the speed of the driven member 4 in the same manner of that described in the previous embodiments. The ball elements 60 move outwardly in the pockets 104 in abutting engagement with inclined surface 102 of force transfer member 92 moving force transfer member axially of the driven member 4 to reduce the drive gap 100. In this embodiment, a cylindrically-curved spring washer 110 is employed for biasing force transfer member 92 in an opposite direction in the same manner as compressible springs 50 of the embodiment of FIGS. 1 through 4. Thus, when the force of the spring 110 exceeds the axial component of force exerted by ball elements 60 against force transfer members 92, force transfer member 92 is moved in an opposite direction to increase the width of the drive gap 100.

Figure 9:
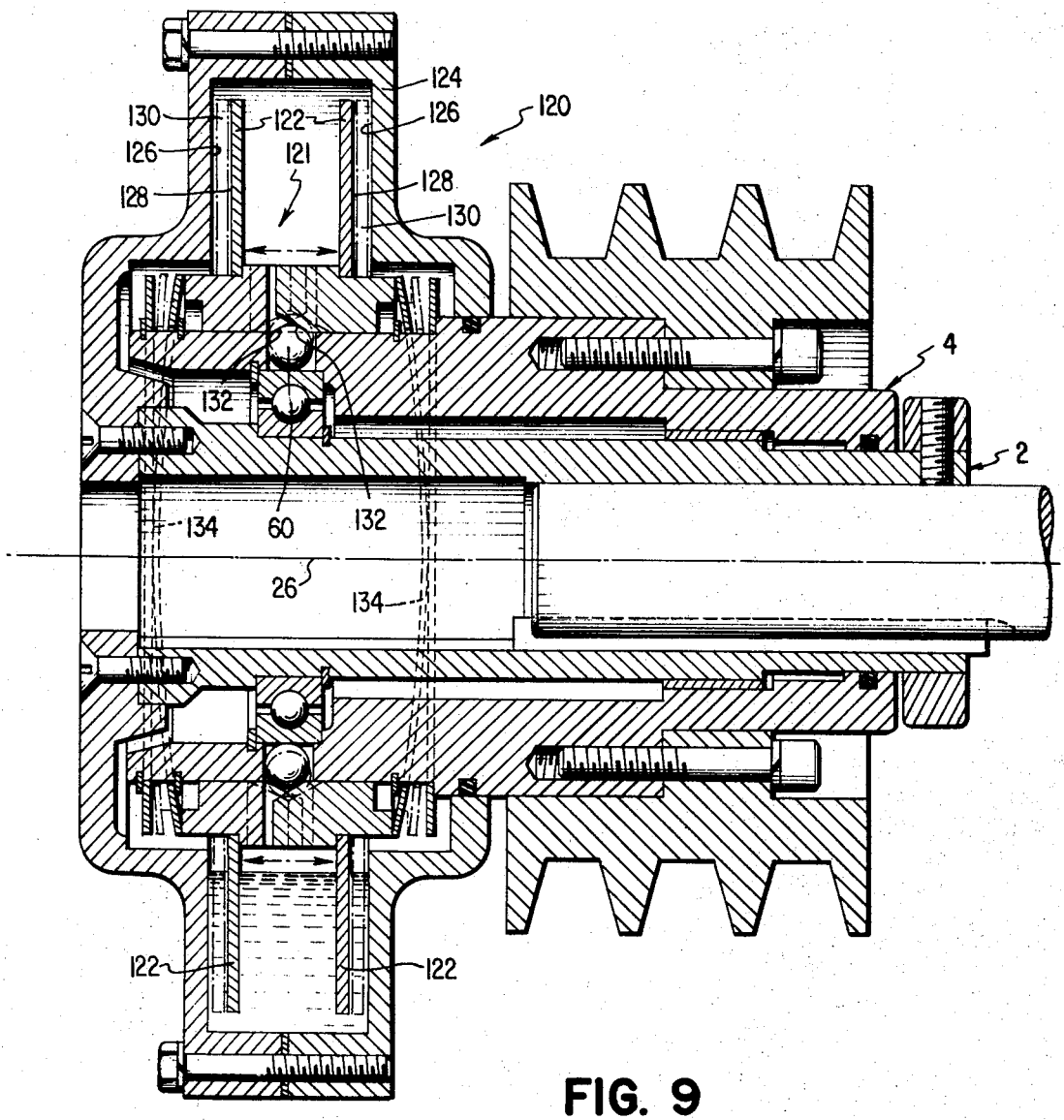
FIG. 9 is an axial sectional view of a fluid drive assembly illustrating a modification of this invention wherein a pair of opposed, oppositely movable force transfer members are carried by the output or driven member and are movable in opposed directions by the ball elements of this invention.

Referring to FIG. 9, a modified form of this invention is disclosed in a fluid drive assembly designated by the reference numeral 120. Fluid drive assembly 120 operates by the same principle as that employed in previously described drive assemblies but employs a modified form of a speed-responsive control assembly designated by the reference numeral 121. This modified speed control assembly 121 is comprised of a pair of opposed, oppositely movable force transfer members 122 actuated by ball elements 60 circumferentially spaced about the rotational axis 26 of the driven member 4. Driving member 2 includes a housing 124 having a pair of opposed force-imparting surfaces 126 in communication through the viscous shear fluid medium with force-receiving surfaces 128 respectively, each pair of surfaces defining a drive gap 130 disposed normally to the rotational axis 26 of the driven member 4.

Each of the force transfer members 122 defines an inclined surface 132 disposed in cooperative abutting relation to certain of the ball elements 60. Surfaces 132 are inclined toward the rotational axis 26. Alternate ball elements 60 engage the inclined surface 132 of the one transfer member 122 such that half of the ball elements 60 are engaging surface 132 of one of the transfer members 122 and the other half of the ball elements 60 engage the surface 132 of the other transfer member 122. Each of the transfer members 128 are biased by a cylindrically-curved spring washer 134 which serves to oppose the force exerted by the ball elements 60.

The operation of this embodiment is like that disclosed previously in that the speed-responsive control assembly 121 is responsive to the rotational speed of driven member 4 about its axis 26. By the use of two force transfer members 122, however, a greater percentage of the force imparted by driving member 2 is transferred to driven member 4 thereby increasing the power capacity of the drive assembly. In this embodiment, this advantage is very effectively provided with a single circumferentially-spaced row of ball elements 60 disposed about the rotational axis 26 of the driven member 4.

Figure 10:
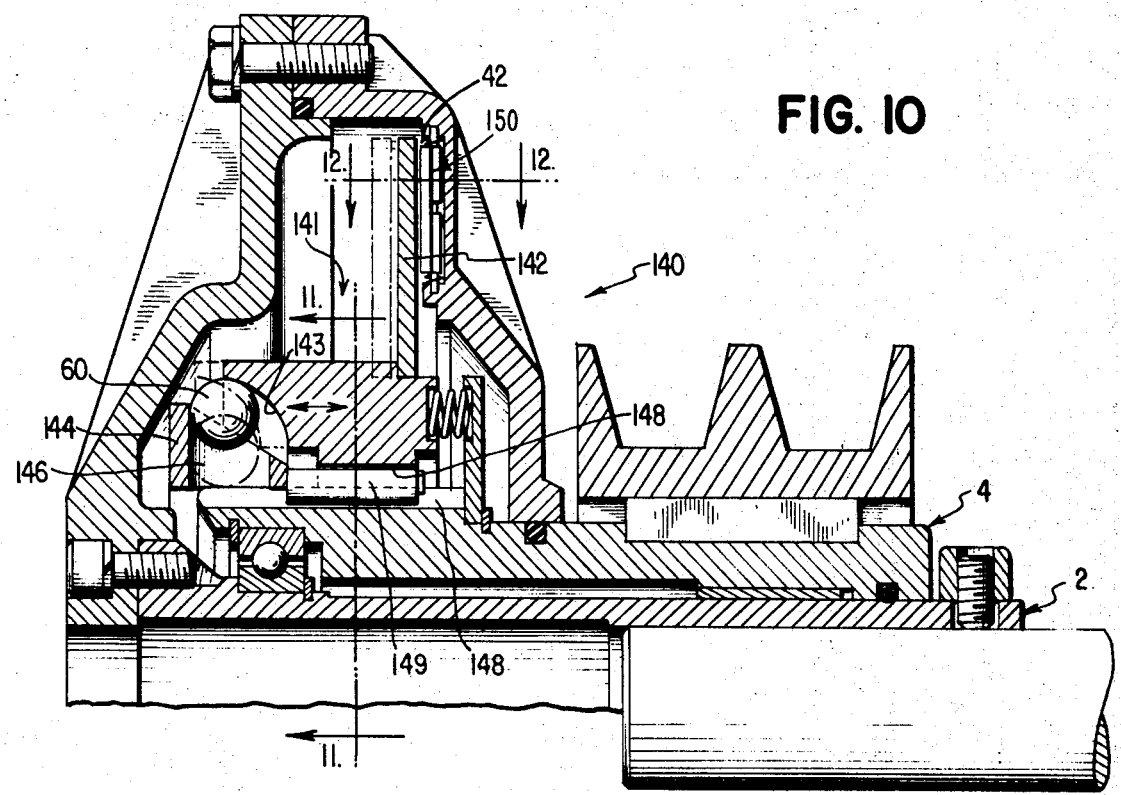
FIG. 10 is a fragmentary axial sectional view illustrating a fluid drive assembly embodying a modification of this invention wherein the ball element contacting surface of the force transfer member is arcuately concavely shaped.

Referring to FIG. 10, a modified form of this invention is illustrated in a fluid drive assembly designated by the reference numeral 140. The fluid drive assembly 140 includes a speed-responsive control assembly 141 similar to control assembly 81 illustrated in FIG. 6 except that force transfer member 142 defines a force-translating surface 143 characterized by its concavely arcuate shape. Thus, instead of the inclined linear surface as illustrated in the previous embodiment, a concavely arcuate surface 143 is provided having a chord inclined relative to the rotational axis 26, said chord being inclined toward said axis 26, the plane of the drive gap 42, as well as the desired movement direction for force transfer member 142.

Figure 12:
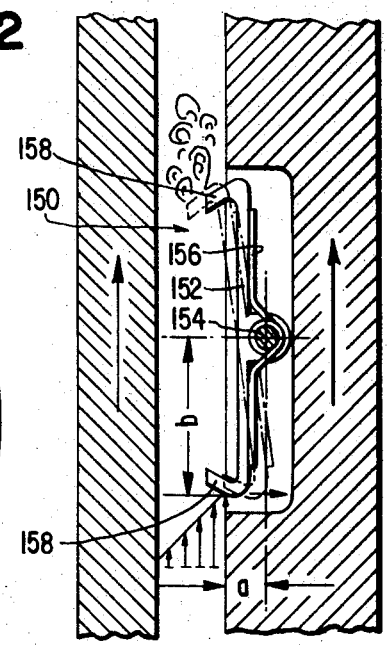
FIG. 12 is a sectional view taken on line 12—12 of FIG. 10 illustrating a spoiler member recessed in the force imparting surface of the driving member having flanges reciprocally movable in and out of the drive gap to disrupt the fluid flow.

In addition, and as illustrated in FIGS. 10 and 12, a spoiler assembly 150 is disclosed in the drive assembly 140, said spoiler assembly 150 including a flow spoiler 152, a pivot pin 154 and a torsion spring 156. The purpose of the spoiler assembly 150 is to disrupt the flow through the drive gap when an overload condition is obtained. The spoiler is positioned so that it senses force variations in the force transfer through the viscous shear fluid in the drive gap 42. As the magnitude of the load increases, the speed of the driven member decreases. While the speed of the driving member 2 may also decrease, this does not occur in direct proportion to the decrease in speed of the driven member 4. Thus, there occurs an increase in the speed differential between the driving and driven members 2 and 4 respectively. This increase in the speed differential allows the fluid film in gap 42 to support a greater force. This increased load force cams one end of the spoiler away from the fluid motion medium causing the other end to project further into the fluid medium resulting in a disruption of the fluid flow reducing the ability of the fluid medium to transfer torque between the drive and driven members 2 and 4 respectively. Thus, spoiler assembly 150 is employed as a means of cushioning the driving member 2 from the effects of overloading.

Figure 11:
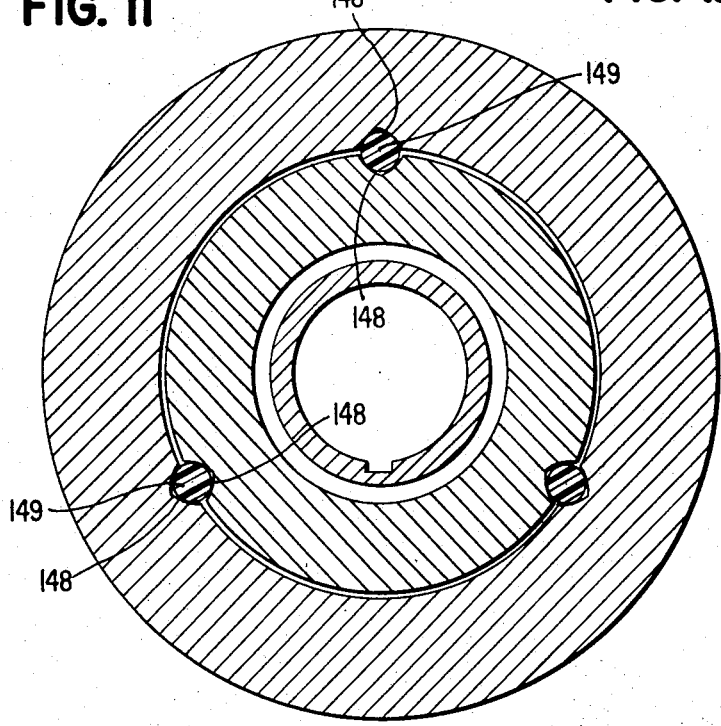
FIG. 11 is a sectional view taken on line 11—11 of FIG. 10 illustrating particular keys and keyways spaced circumferentially about the driving and driven members.

As illustrated, pivot pin 154 is disposed in a direction radially of rotational axis 26. Spoiler 152 includes a pair of spaced flanges 158 and is swingably connected to pivot pin 154 at a point intermediate flanges 158. Flanges 158 are therefore reciprocally swingable in a reverse direction transversely of the drive gap 42 under the action of torsion spring 156. An increased load transfer to the viscous shear fluid medium is sensed by the first flange 158, said flange being moved away from the drive gap 42 thereby causing the downstream flange 158 to be projected into the fluid gap tending to disrupt flow and create a turbulent condition within the fluid gap. Referring to FIG. 11, mating keyways 148 having the cross-sectional shape of a gothic arch are formed in the driven member 4 and the force transfer member 142 respectively. Cylindrically-shaped keys 149 are positioned in the keyways 148 for guiding the axial movement of member 142 and transfer of the rotational driving force between member 142 and driven member 4. The keys are formed of conventional low friction plastic. This arrangement eliminates the need for specially coated keys and specially bushed or coated keyways.

Figure 13:
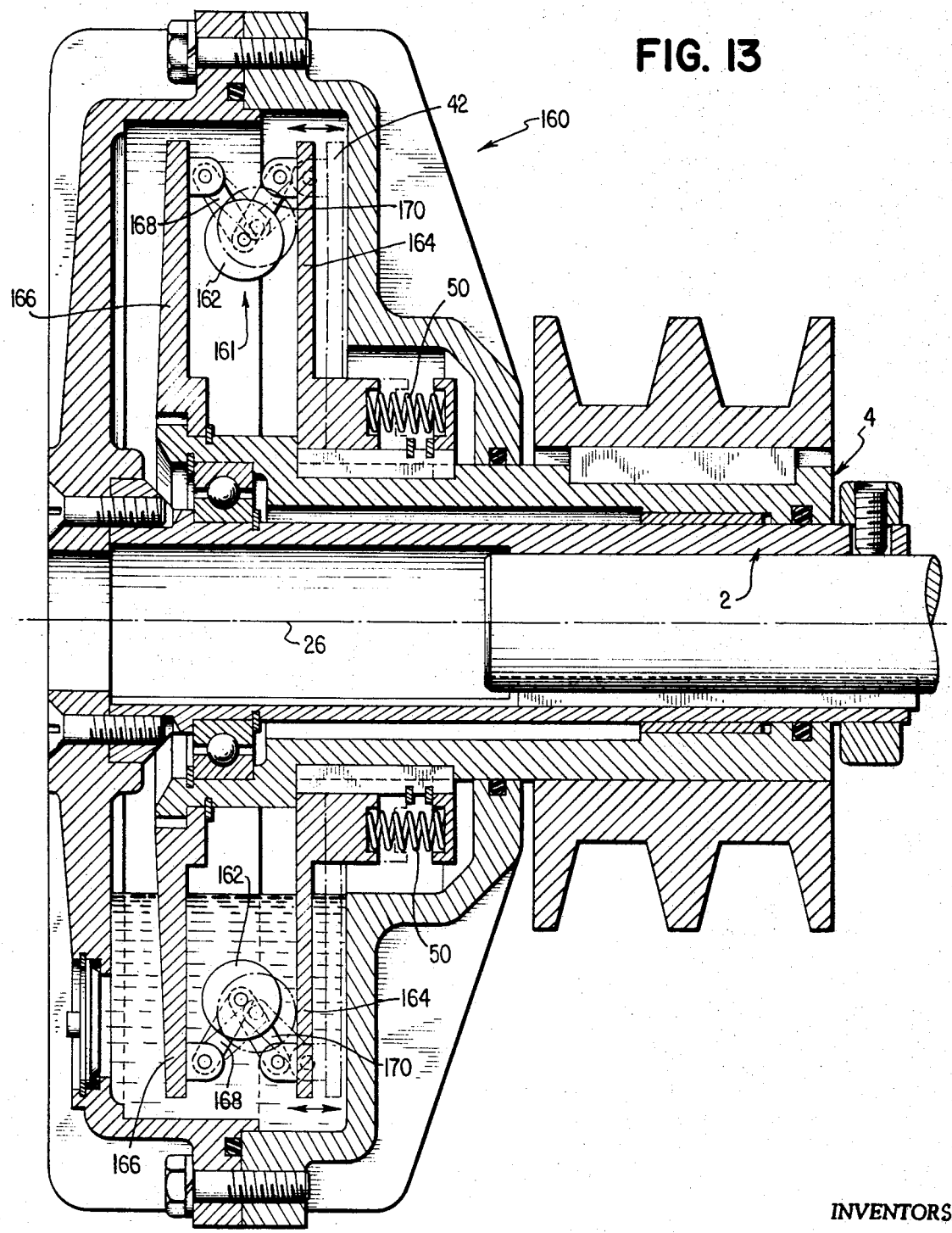
FIG. 13 is an axial sectional view through a drive assembly embodying a modification of this invention wherein circumferentially spaced weighted ball-like elements are swingably connected by linkage means to the force transfer member and to a stationary flange carried by the output or driven member, said weighted elements being actuated by centrifugal force to move the force transfer member reciprocally to open and close the drive gap between the force imparting and force receiving surfaces.

Referring to FIG. 13, a modified form of this invention is illustrated and designated by the reference numeral 160. The drive assembly 160 includes a speed-responsive control assembly 161 having a plurality of circumferentially-spaced, swingable weighted camming elements 162 whose swinging action relative to the axis 26 serves to cam a force transfer member to close a drive gap. Each element 162 is swingably connected to a force transfer member 164 and to a fixed flange 166 carried by the driven member 4. In the illustrated embodiment, the weighted element 162 is swingably connected to a pair of linkages 168 and 170, linkage 168 being swingably connected to fixed flange 166 and linkage 170 being swingably connected to force transfer member 164. Thus, the weighted elements 162 are connected by suitable force-translating linkage means to the force transfer member 164 such that the movement of the weighted elements 162 toward and away from the rotational axis 26 of the driven member 4 causes a reciprocal movement of the force transfer member 164 axially of the driven member 4 to decrease the drive gap 42 between the force-imparting and force-receiving surfaces.

The linkages 168 and 170 must have a combined length equal to or greater than the maximum spacing between the fixed flange 166 and the movable force transfer member 164. Thus the weighted elements 162 tend to vary their spacing relative to axis 26 dependent on the centrifugal force exerted by driven member 4 and force the force transfer member 164 against the compression force of springs 50 to decrease the drive gap 42. Otherwise the fluid drive assembly 160 is operable in the same manner as is previously described in FIGS. 1 through 4.

It is to be understood that the forms of the invention herein shown and described are to be taken as preferred examples of the invention and various changes and modifications in the arrangement of parts and the interconnection of components may be resorted to without departing from the spirit of the invention or the scope of the appended claims. All such variations and modifications which come within the spirit and scope of the appended claims are intended to be included herein as fully and completely as if they had been specifically illustrated, described and claimed. Thus, the modifications specifically disclosed are exemplary only and are not intended to be limiting on the scope of the invention. The scope of the invention is defined by the following claims:

We claim:
1. A fluid drive of the viscous shear fluid type comprising:
 a. driving means defining a force-imparting surface for transfer of a driving force to a viscous shear fluid medium;
 b. driven means operable by a force transferred from said driving means through said viscous fluid medium for rotation about an axis;
 c. a force transfer member defining a force-receiving surface in spaced, opposed relation to said force-imparting surface, said transfer member being mounted on said driven means for reciprocal movement to vary the spacing between force-receiving and imparting surfaces and for rotation with said driven means;
 d. means for moving said force transfer member to reduce the spacing between the force-receiving and imparting surfaces, said moving means including centrifugally-actuated elements in force-imparting relation to said force transfer member; and
 e. return means operable on said force transfer member for increasing the spacing between said surfaces when the force imparted by said centrifugally-actuated elements is decreased.

2. A fluid drive of the viscous shear fluid type comprising:
a. driving means defining a force-imparting surface for transfer of a driving force to a viscous shear fluid medium;
b. driven means operable by a force transferred from said driving means through said viscous fluid medium for rotation about an axis;
c. a force transfer member defining a force-receiving surface in spaced, opposed relation to said force-imparting surface, said transfer member being mounted on said driven means for reciprocal movement to vary the spacing between force-receiving and imparting surfaces and for rotation with said driven means;
d. means for moving said force transfer member to reduce the spacing between the force-receiving and imparting surfaces, said moving means including centrifugally-actuated elements in force-imparting relation to said force transfer member, retaining means on said driven means for positioning said elements about said axis and permitting reciprocal movement of said elements toward and away from said axis, the spacing of said centrifugally-actuated elements from said axis being proportional to the centrifugal force exerted by the rotatably driven means; and
e. means for biasing said force transfer member against the force exerted thereon by said centrifugally actuated elements to increase the spacing between said surfaces when the said centrifugal force is decreased.

3. A fluid drive of the viscous shear fluid type as recited in claim 2 wherein the force transfer member is movable in a first direction and the centrifugally-actuated elements are reciprocally movable away from and toward said rotational axis in directions differing from said first direction and further including means engageable with said centrifugally-actuated elements for translating the centrifugal force exerted by said driven means on said elements to a force having a component for moving said force transfer member to decrease the spacing between said force-imparting and force-receiving surfaces.

4. A fluid drive of the viscous shear fluid type as recited in claim 3 wherein said force-translating means defines at least one surface inclined relative to the axis of said driven means and wherein said centrifugally-actuated elements comprise a plurality of weighted camming elements spaced circumferentially of said axis and movable toward and away from said axis responsively to the centrifugal force exerted by said driven means, said camming elements each engaging the inclined surface of said force-translating means in abutting relation for exerting a force against said inclined surface having a component for moving said force transfer member for decreasing the spacing between said force transfer and force-imparting surfaces.

5. A fluid drive of the viscous shear fluid type as recited in claim 4 wherein said force transfer member is reciprocally movable axially of said driven means.

6. A fluid drive of the viscous shear fluid type as recited in claim 4 wherein said camming elements are comprised of a plurality of ball elements disposed radially of the axis of said driven means in circumferentially spaced relation for rolling engagement with said inclined surface.

7. A fluid drive of the viscous shear fluid type as recited in claim 4 wherein said camming elements are in contacting relation with said force transfer member at spaced circumferential positions about said axis and movement of said camming elements along said inclined surface forces said camming elements against said force transfer member to move said member axially of said driven means.

8. A fluid drive of the viscous shear fluid type as recited in claim 4 wherein said force-translating means contacts said force transfer member whereby the movement of said camming elements along said inclined surface moves said force-translating means.

9. A fluid drive of the viscous shear fluid type as recited in claim 4 wherein said force-translating means is comprised of a camming element guide ring extending circumferentially of said axis, said guide ring defining a plurality of camming element retaining pockets for housing respective camming elements, said pockets each defining a guide surface exteriorly of said camming elements inclined in the desired direction of movement of said force transfer member and away from said axis, said element retaining pockets defining an open side adjacent said force transfer member, each of the plurality of camming elements bearing against the inclined surface and said force transfer member such that the centrifugal force exerted by said driven means causes said camming elements to move outwardly along the inclined surface thereby driving the force transfer member relative to said driven means.

10. A fluid drive of the viscous shear fluid type as recited in claim 6 wherein said biasing means includes a spring means abutting said force transfer member for biasing said force transfer member against each of the plurality of ball elements.

11. A fluid drive of the viscous shear fluid type as recited in claim 10 wherein said force transfer member includes a disc extending circumferentially about said axis and defining a force-receiving surface on one side thereof in opposed spaced relation to said force-imparting surface.

12. A fluid drive of the viscous shear fluid type as recited in claim 2 wherein said fluid drive is of the sheave type, said driven means defining a bore and said driving means extending through said bore, said driving and driven means each being rotated about a common axis.

13. A fluid drive of the viscous shear fluid type as recited in claim 2 wherein said fluid drive is of the coupling type, said driving and driven means being rotated about longitudinally-aligned axes with said driving and driven means extending in different directions.

14. A fluid drive of the viscous shear fluid type as recited in claim 2 wherein said centrifugally-actuated means includes a plurality of ball elements and a ball element retaining means mounted on said driven means for carrying said ball elements in circumferentially-spaced relation about said axis, while allowing said ball elements to move reciprocally toward and away from said axis, said retaining means defining guide surfaces disposed normally to said axis and wherein said force-translating means is a member extending circumferentially of said axis and defining an inclined surface at least at each of said ball elements, said inclined surface being inclined relative to said axis toward the movement direction of said force transfer member and said axis, said ball elements abutting said guide surfaces and inclined surfaces for translating the centrifugal force exerted on said ball elements by the driven means for movement of said force transfer member.

15. A fluid drive of the viscous shear fluid type as recited in claim 4 wherein said inclined surface is concavely arcuate, the chord of the defined arc being inclined relative to the axis of the driven means.

16. A fluid drive of the viscous shear fluid type as recited in claim 2 including a pair of oppositely movable force transfer members carried by said driven means, each defining surfaces inclined toward said axis, said centrifugally-actuated means including a plurality of camming elements circumferentially spaced about said driving member each in abutting relation to one of said inclined surfaces for movement of said force transfer members in opposite directions responsively to the movement of said camming elements.

17. A fluid drive of the viscous shear fluid type as recited in claim 2 wherein said force transfer member defines a force-receiving surface in a plane inclined to said axis, said force-imparting surface of the said driving means being defined in a plane parallel to the plane of said force-receiving surface.

18. A fluid drive of the viscous shear fluid type as recited in claim 2 wherein said force transfer member defines a force-receiving surface in a plane normal to said axis, said force-imparting surface of said driving means being defined in a plane parallel to the plane of said force-receiving surface.

19. A fluid drive of the viscous shear fluid type as recited in claim 2 wherein one of said driving and driven means includes means for spoiling the flow of the viscous shear fluid between said force-imparting and force-receiving surfaces.

20. A fluid drive of the viscous shear fluid type as recited in claim 19 wherein said spoiler means is comprised of a spoiler member recessed in one of the force-receiving and force-imparting surfaces, said spoiler member having first and second flanges spaced along the fluid flow and extending transversely of said fluid flow, and means for pivoting said spoiler member about an axis intermediate said flanges whereby the depth of penetration of said flanges into said flow is variable responsive to said flow and in opposite directions in and out of said flow.

21. A fluid drive of the viscous shear type as recited in claim 2 wherein said centrifugally-actuated elements are swingably carried on said driven means, the arc of swing of said elements toward and away from said axis being proportional to said centrifugal force.

22. A fluid drive of the viscous shear type as recited in claim 21 including means for translating the swinging movement of said centrifugally-actuated elements to a force for movement of said force transfer member axially of said driven means.

23. A fluid drive of the viscous shear fluid type as recited in claim 2 wherein said driven means includes at least one flange in opposed spaced relation to said force transfer member, said flange being fixed on said driven means against axial movement, said centrifugally-actuated means including weighted members swingably connected by linkage means to said flange and said force transfer member whereby reciprocal movement of said weighted members relative to said axis by the centrifugal force exerted thereon varies the spacing between said flange and said force transfer member to thereby selectively vary the spacing between the force-imparting and force-receiving surfaces.

24. A fluid drive of the viscous shear fluid type as recited in claim 23 wherein said weighted members are swingably connected by first links to said flange and by second links to said force transfer member, said first and second links each being pivotally connected to the weighted members, said first and second links having a combined length in excess of the spacing between said flange and said force transfer member when said force transfer member is in maximum driving relation to said driving means whereby movement of said weighted members away from said axis moves said force transfer member away from said flange to decrease the spacing between said force-imparting and force-receiving surfaces and the opposite movement of said weighted member toward said axis causes an increase in said spacing between said force-imparting and receiving surfaces.

25. In a fluid drive of the viscous shear fluid type having a driven member and a driving member communicable through a viscous shear fluid medium drive gap to transmit a driving force to a load, a speed-responsive device carried by said driven member for regulating the width of said drive gap:
   a. a driven element rotatable about an axis;
   b. a force transfer member;
   c. cooperative means on said driven element and said transfer member for mounting said transfer member to said driven element for rotation therewith and limited axial movement thereof;
   d. centrifugally-actuated elements;
   e. means for retaining said actuated elements about said driven element permitting limited reciprocal movement of said actuated elements toward and away from said axis, the spacing of said actuated elements from said axis being proportional to the centrifugal force exerted by the rotation of said driven element about said axis;
   f. means for translating the force of said centrifugally-actuated elements to a force having a component directed parallel to the axis of said driven element for moving said force transfer member in one direction; and
   g. biasing means for opposing the movement of said force transfer member and moving said force transfer member in an opposite axial direction when said translated force is reduced below a predetermined level.

26. A speed-responsive device as recited in claim 25 wherein said translating means includes an inclined surface in contacting relation to said centrifugally-actuated elements, said surface being inclined relative to the centrifugal force of said actuated elements for translating said force to a force having a component extending axially of said driven element.

27. A speed-responsive device as recited in claim 25 wherein said inclined surface is associated with said force transfer member and is inclined toward said axis and the direction of movement of said force transfer member is effected by said actuated elements.

28. A speed-responsive device as recited in claim 26 wherein said surface is inclined toward said axis and away from said movement of the force transfer member as effected by said actuated elements, said actuated elements being in contacting relation to and between said surface and said force transfer member.

29. A speed-responsive device as recited in claim 26 wherein said actuated elements are spherical in shape for rolling engagement with said inclined surface.

30. A speed-responsive device as recited in claim 26 wherein said surface is concavely arcuate with the chord of the defined arc inclined relative to the axis of said driven element.

31. A speed-responsive device as recited in claim 25 wherein said retaining means carries said centrifugally-actuated elements for swinging arcuate movement about a point, the arc length being proportional to said centrifugal force.

32. A speed-responsive device as recited in claim 31 wherein said driven element includes a flange in opposed spaced relation to said force transfer member, said flange being fixed on said driven element against axial movement, said centrifugally-actuated elements including weighted members swingably connected by linkage means to each of said flange and said force transfer member whereby reciprocal movement of said weighted members relative to said axis of the driven element moves said transfer member.

33. A speed-responsive device as recited in claim 25 including a pair of oppositely movable force transfer members carried by said driven element, each defining surface oppositely inclined toward said axis from a point of intersection, said centrifugally-actuated means including a plurality of actuated elements circumferentially spaced about said axis, each in abutting relation to an inclined surface for movement of said force transfer members in opposite directions responsively to the movement of said actuated elements.

34. A speed-responsive device as recited in claim 25 wherein said force transfer member is keyed to said driven element for rotation therewith and axial movement thereof, said force transfer member and driven element each defining mating keyways each having a cross-sectional shape of a gothic arch, said mating keyways being spaced circumferentially of said driven element and keys disposed in said mating pairs of keyways comprised of cylinders.

35. A speed-responsive device as recited in claim 34 wherein said cylinders are comprised of a low friction plastic.

UNITED STATES PATENT OFFICE
CERTIFICATE OF CORRECTION

Patent No. 3,536,173            Dated    October 27, 1970

Inventor(s)      Clifton S. Merkert et al.

It is certified that error appears in the above-identified patent and that said Letters Patent are hereby corrected as shown below:

Column 1, line 36, "speeds" should read -- speed --. Column 9, line 56, cancel "motion". Column 14, line 16, "25" should read -- 26 --.

Signed and sealed this 18th day of January 1972.

(SEAL)
Attest:

EDWARD M. FLETCHER, JR.          ROBERT GOTTSCHALK
Attesting Officer                 Acting Commissioner of Patents